United States Patent

Burwen

[15] 3,678,416

[45] July 18, 1972

[54] DYNAMIC NOISE FILTER HAVING MEANS FOR VARYING CUTOFF POINT

[72] Inventor: Richard S. Burwen, 12 Holmes Road, Lexington, Mass. 02173

[22] Filed: Nov. 3, 1970

[21] Appl. No.: 86,398

[52] U.S. Cl. ....................333/17, 179/1 P, 328/167

[51] Int. Cl. ....................H03h 7/10, H04b 15/00

[58] Field of Search ....................333/17, 70 R, 28 T; 325/477; 179/1 D, 1 P, 1 VC

[56] References Cited

UNITED STATES PATENTS

| | | | |
|---|---|---|---|
| 2,638,501 | 5/1953 | Coleman | 333/28 T |
| 2,413,263 | 12/1946 | Suter | 333/17 |
| 2,606,971 | 8/1952 | Scott | 333/70 R X |
| 2,606,969 | 8/1952 | Scott | 333/70 R X |
| 3,543,191 | 11/1970 | Plunkett | 333/17 |

*Primary Examiner*—Paul L. Gensler
*Attorney*—Weingarten, Maxham and Schurgin

[57] ABSTRACT

A dynamic noise filter especially adapted for use in high fidelity audio reproduction systems to eliminate perceived noise. Controllable high-pass and low-pass filters are employed which respectively filter the low and high frequency portions of the audio spectrum. A very wide dynamic range of controllable cutoff points is achieved by each filter with different selectable rates of attenuation with frequency. The same attenuation characteristics are maintained throughout the range of cutoff points for each filter. In the presence of masking audio signals a fast attack, slow decay control is developed for each filter to cause the amount of filtering to decrease with increasing masking signals. The novel noise filter further features high frequency click impulse reduction, hum noise attenuation, and corner peaking and attenuation rate control.

24 Claims, 4 Drawing Figures

INVENTOR
RICHARD S. BURWEN
BY
Weingarten, Maxham & Schurgin
ATTORNEYS

INVENTOR
RICHARD S. BURWEN
BY
Kingsworthen Moshen & Schinger
ATTORNEYS

INVENTOR
RICHARD S. BURWEN
BY
Weingarten, Maxham & Schurgin
ATTORNEYS

DYNAMIC NOISE FILTER HAVING MEANS FOR VARYING CUTOFF POINT

FIELD OF THE INVENTION

This invention relates generally to electrical signal filters and more specifically to audio active filters having automatically controlled cutoff points.

BACKGROUND OF THE INVENTION

In high fidelity audio reproduction the least amount of noticeable noise in an audio signal is very annoying and significantly reduces the advantages and satisfaction of accurate sound reproduction. Noise is an ever present distraction in almost every audio system, originating not only in electronic signal processing, but also in broadcasting and reception, in tape and disk recording and playback and in many modern musical instruments with electronic pick-up. Much of the commercially recorded material on tapes and records has an annoying level of background noise recorded with the program material.

Despite the continuous presence of noise in almost every audio reproduction, a listener's awareness of noise depends upon the signal strength of the noise relative to the signal strength of program material within the same portion of the audio frequency spectrum. Thus, during full symphonic passages, the listener is usually wholly unaware of even substantially high noise levels added to the program music, while during soft passages the listener is usually quite aware of even low levels of noise. Noise which occurs at frequencies outside the frequency range of the program material is also very perceptible to a listener, even in the case of low level noise in the presence of higher level program material.

The masking effect of program material in hiding background noise over the frequency range of the program material can be used to reduce a listener's awareness of such noise by selectively filtering out portions of the audio spectrum in which there is no program material and reducing the filtering in the presence of program material. In most audio systems, the objectionable noise levels occur in the low and high frequency regions of the audio spectrum. Program material in the middle frequency ranges is almost always present to mask what is normally a lower level of background noise in these middle ranges.

An early system which was partially successful in eliminating perceived high and low frequency noise with controllable cutoff filtering was developed in the 1940's and is described in U.S. Pat. Nos. 2,173,426; 2,606,969; 2,606,970; 2,606,971; 2,606,972; 2,606,973; and 2,759,049; in the name of H.H. Scott. These patents relied primarily upon RLC filters which were controlled in their frequency response by varying the capacitance of a reactance tube.

This early Scott system, which was developed during the era of scratchy shellac phonograph records, was a contribution to noise reduction as measured by the state of the art in those days. Later improvements in audio reproduction, specifically lower noise plastic long playing records and high quality, lower noise record and tape playing equipment provided sufficiently lower noise to eliminate the need for this early system.

Other factors emerged to make the prior art controllable filters incompatible with modern audio systems. The greatly improved audio systems developed in the fifties required much lower distortion from active circuitry than had previously been demanded. RLC reactance tube systems with a gradually rounded corner in the frequency response curve near the point of cutoff produce unwanted effects, while the resulting RLC tuning has a Q that varies with the cutoff frequency and results in signal distortion as the attenuation curve changes shape with changes in the cutoff point.

To operate effectively with modern audio systems it is important that the control signals for the high and low frequency cutoff filtering be developed only from high and low frequency signal content and not from middle frequency range signal content. Since this was less important for audio reproduction systems of the forties where much of the high frequency signal content was due to harmonics of middle range fundamental frequencies the earlier systems could and did control frequency response from middle frequency range signal content. High frequency fundamentals which are commonly reproduced today would be totally filtered by these prior art systems.

Finally, the previous systems had a very limited range of control for the cutoff frequencies on both high- and low-pass filters. This necessitated a compromise between the amount of high or low frequency noise eliminated during full filtering action and the extent of low and high frequency signals which could be passed during minimum filtering. These early systems are thus of limited use in modern audio systems where high and low frequency noise spans usable frequency ranges up to a 30 to 1 frequency ratio.

BRIEF SUMMARY OF THE INVENTION

In an exemplary preferred embodiment of the invention, a dynamic noise filter is provided which effectively attenuates to the point of imperceptibility high and low frequency noise in the absence of masking high and low frequency signals, but passes the high and low frequency signals to the extent that they mask the noise present.

A controllable cutoff low-pass filter functions to pass low and middle range frequencies of the audio spectrum, while a series connected controllable cutoff high-pass filter functions to pass middle and high frequency ranges of the audio spectrum. Separate fast attack, slow decay control signals are developed for the high-pass and low-pass filters to vary the point of frequency cutoff to substantially pass without filtering any masking program signals in the respective filter bands.

Low frequency filtering is accomplished with an operational amplifier having a first linear, frequency-independent feedback path and a second feedback path which increases the degree of feedback with decreasing frequency. At a controllable frequency, the feedback from the second path becomes a significant portion of the total feedback and begins to cause an attenuation increasing inversely with frequency over the amplifier's low frequency range. Two such feedback amplifier stages are selectively provided, one having twice the attenuation rate as the other, so that three attenuation rates are selectable. Varying the gain of the frequency sensitive feedback in response to a control signal path alters the cutoff frequency of both amplifier stages.

The high frequency filtering is similarly accomplished by using the frequency dependent feedback path of the low frequency filter as a forward, non-feedback path to produce an attenuation increasing with frequency, and by flattening this attenuation curve for low and middle range frequencies with a frequency independent feedback path around the filter. As with the low frequency filter, the high frequency filter has two serially connected stages providing a total of three selectable attenuation rates.

The frequency dependent feedback and forward conduction paths of the low and high frequency filters, respectively, are formed of low distortion series connected precision multipliers and integrators. Each control signal is a multiplicand input to the multipliers providing a large range of controllable cutoff frequencies over a frequency ratio of approximately 30 to 1. The use of integrators provides a linear attenuation characteristic, sharp corner transition between attenuation and flat response and controllable corner peaking all of which are independent of cutoff frequency. There results a system of controlled filtering with exceptionally low distortion at any bandwidth. A prefilter includes hum induced noise elimination and suppression of high frequency, high magnitude click impulses. The click suppression reduces the objectionable characteristics of the clicks and prevents them from activating the high frequency filter.

BRIEF DESCRIPTION OF THE DRAWINGS

The invention will be more fully understood by referring to the following detailed description of a preferred embodiment and the accompanying drawings, in which.

DETAILED DESCRIPTION OF THE PREFERRED EMBODIMENT

Figure 1:
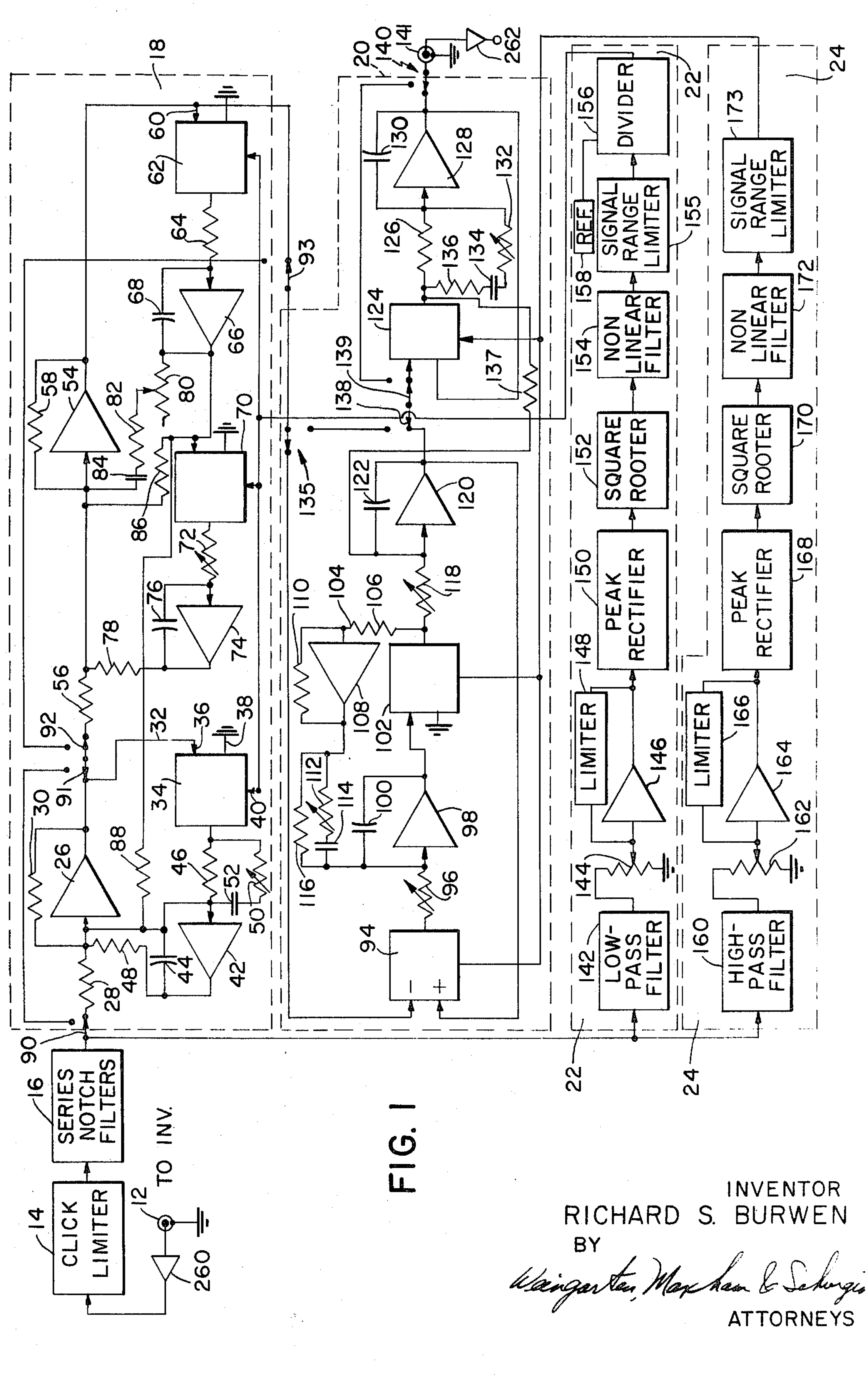
FIG. 1 is a block diagram and partial schematic representation of a dynamic noise filter according to the invention.

Referring to FIG. 1 there is shown a block diagram and partial schematic of a preferred dynamic noise filter according to the invention. An input 12 of the dynamic noise filter is fed to a click limiter 14 operable in one of two alternative versions to either: (1) slope limit the input signal such that very short duration, high magnitude, high frequency (e.g. 10 kHz and higher) click or pop impulses are reproduced as lower magnitude triangle waves; or (2) to blank the signal from the input for a period equivalent to the duration of the short duration impulses and provide in their place at the output of click limiter 14 a constant signal equal to the average signal level of the low frequency content of the input signal during the click impulse.

The click limiter 14 serves two purposes in the dynamic noise filter. First, it limits the magnitude of each click impulse, such as is found in old and dusty records, to make it less audible, and second, it prevents the dynamic noise filter from interpreting the click impulse as program material which should be passed through the high frequency filter.

The signal output of the click limiter 14 passes to filters 16 which comprise a series of very sharp band-elimination filters which can be selectively switched into or out of the signal path to eliminate hum induced noise at 30, 60, 120, and 180 Hz. The advantages of the series notch filters 16 are similar to those for the click limiter 14 in that the hum induced noise is not interpreted by the dynamic noise filter as program material. In general, however, the series notch filters 16 will be effective in themselves in eliminating substantially all of the hum induced noise.

The basic dynamic noise filter consists of a controllable cutoff frequency high-pass filter 18 having its cutoff frequency ranging over the low frequency portion of the audio spectrum, typically between 10 and 300 Hz. The output of the low frequency, high-pass filter 18 is passed to a high frequency, low-pass filter 20 having a controllable cutoff frequency which ranges over the high frequency portion of the audio spectrum typically from 1.0 to 30.0 kHz.

Receiving the same inputs as the low and high frequency filters 18 and 20 are low and high frequency control signal generators 22 and 24 respectively which control the cutoff point of the corresponding low and high frequency filters 18 and 20. Each control signal generator filters its input to eliminate all but the range of frequencies through which the cutoff frequency of its corresponding controlled filter is variable. The filtered signal in each control signal generator is limited and peak rectified to provide a substantially DC output representative of the peak magnitude of the input to the dynamic noise filter in the specific frequency ranges that are filtered. Each DC control signal responds rapidly to changes in input signal magnitude within the selected frequency range but decays more slowly from the last peak magnitude. Typical attack rates are in the range of less than one millisecond but may reach ten milliseconds for very noisy sources while decay rates extend from thirty to three hundred milliseconds. The peak rectified signal is volume compressed to lower the rate of variation in cutoff frequency with high level signals. Non-linear filtering then provides a low-pass characteristic while maintaining the fast attack capability.

The components within the low frequency filter 18 which accomplish the filtering function are all active elements. No passive RLC filters are used. Specifically, the output of the series notch filters 16 is fed to an operational amplifier 26 through a resistance 28 which in conjunction with a feedback resistance 30 determines the normal gain for the operational amplifier 26. A second feedback path 32 around the amplifier 26 comprises a multiplier 34 having differential $x$ inputs 36 and 38 and a single y input 40. The inverting $x$ input is attached to the output of the operational amplifier 26 while the noninverting $x$ input is grounded, and the $y$ input is connected to the output of control signal generator 22. The output of multiplier 34 is fed to an operational amplifier 42 operating as an integrator with a feedback capacitor 44 and series input resistor 46. The output of amplifier 42 is fed through a resistance 48 to the input of amplifier 26 completing the feedback path 32. An integration rate adjustment for integrating amplifier 42 is provided by a variable resistance 50 in series with a large DC blocking capacitance 52 across resistor 46.

In the absence of feedback from path 32 operational amplifier 26 is a broadbanded amplifier with a gain determined by the ratio of resistor 30 to resistor 28. At high frequencies the feedback path 32 contributes a negligible feedback current to the amplifier 26 as compared to the feedback through resistor 30. However, as the frequency drops the gain of integrating amplifier 42 increases and will ultimately provide sufficient feedback to the amplifier 26 to reduce its overall gain. At even lower frequencies the feedback contributed from integrating amplifier 42 is far more significant than the feedback from resistor 30 causing the gain of the amplifier 26 to fall off linearly with decreasing frequency at a 6db per octave rate. The transition between flat and attenuated responses is relatively sharp and distortion free. The cutoff, or 3db point, can be varied by adjusting the gain of multiplier 34 with a different y control signal input. Multiplier 34 accomplishes this function by operating basically as a variable gain amplifier with an output equal to the inverting $x$ input scaled by the $y$ input from control signal generator 22. For large $y$ inputs to multiplier 34 and corresponding large gains, the feedback from integrating amplifier 42 is large for a given frequency and the cutoff point reached at a relatively high frequency. For small $y$ inputs a relatively low cutoff frequency is obtained.

The variable resistor 50 gives an adjustment to the integration time constant and phasing of amplifier 42 and thus shifts the range of cutoff frequencies of the amplifier 26. The $y$ input to the multiplier 34 is constrained between upper and lower limits set by control signal generator 22 and effects the overall gain of the feedback path 32 to define the end-points of the range of cutoff frequencies as adjusted by resistor 50. Frequency variation by a factor of 30 to 1 is possible.

To provide a wide range of control for the cutoff frequency with low signal distortion, the multiplier 34, as well as all subsequently described multipliers, is a two quadrant transconductance type multiplier. Such a multiplier is really half of a well known four quadrant multiplier and comprises a differential input amplification stage for an $x$ input with outputs to a differential amplifier and a controllable combined emitter current. A $y$ input provides the control for the emitter current through a controllable current source.

The combination of the two feedback paths around the amplifier 26 provides a high-pass, or low frequency, filter with a constant linear 6db per octave attenuation rate beyond a smooth, rounded corner transition where the feedback path 32 begins to provide a significant portion of the feedback around the amplifier 26. The use of functional modules such as precision multipliers and operational amplifiers connected to operate as amplifiers and integrators allows not only a wide range of control for the cutoff frequency of the filter but a very low overall distortion.

The output of the amplifier 26 is fed to a further operational amplifier 54 having input and feedback resistors 56 and 58 respectively. A second feedback path 60 around the operational amplifier 54 is composed of two multiplier and integrator combinations instead of the one used with amplifier 26. A first multiplier 62 receives the output of amplifier 54 and passes it through resistance 64 to operational amplifier 66 having a capacitor 68 providing feedback and imparting the characteristics of an integrator to amplifier 66. From the output of amplifier 66 a further multiplier 70 is provided with its output passing through a variable resistor 72 to an operational amplifier 74 having a feedback capacitor 76 to cause the amplifier 74 to integrate. The output of amplifier 74 is passed through a resistor 78 to the input of operational amplifier 54 to complete a double integration feedback path 60. From the output of the amplifier 66 a variable resistor 80 provides controlled conduction to the input of operational amplifier 54 through a resistor 82 and D.C. blocking capacitor 84. A resistor 86 is in parallel across the combination of resistors 80 and 82 and capacitor 84. Also from the output of amplifier 66 a further path leads through a resistance 88 to the input of amplifier 26.

The variable resistor 80 in combination with the path from the output of amplifier 66 to the inputs of amplifiers 26 and 54 provides a phasing adjustment for the overall combination of amplifiers 26 and 54 with their respective feedback paths. The phasing adjustment provided by resistors 80 and 88 varies the corner peaking, or the degree of overshoot in the response of the amplifiers 26 and 54 near the point where attenuation begins. By adjusting resistors 80 and 88 and resistors 50 and 72 to provide approximately 4db of overshoot in amplifier 54 and approximately 4db of attenuation from amplifier 26 at that same frequency an exceptionally smooth and distortion free response is obtainable from the filter characteristic of amplifiers 26 and 54 in combination by providing a linear attenuation with frequency and a sharp corner between flat and attenuated responses.

The double integration negative feedback path around amplifier 54 provides a 12db per octave attenuation characteristic in the filtering range of amplifier 54, and together with amplifier 26 provides an overall attenuation rate of 18db per octave with a cutoff frequency ranging between 10 and 300 Hz.

Switches 90 and 91 in a normally closed position connect respectively the output of filters 16 to the input of amplifier 26 through resistor 28 and the output of amplifier 26 to the input of amplifier 54 through resistor 56. In a normally open position switches 90 and 91 disconnect the amplifier 26 and connect the output of the notch filters 16 directly to the resistor 56. Likewise switches 92 and 93 in normally closed positions connect respectively the output of amplifier 26 to the amplifier 54 through resistor 56 and the output of amplifier 54 to high frequency filter 20 and in normally open positions connect the output of amplifier 26 directly to filter 20.

The feedback through resistor 88 from the output of amplifier 66 to the input of amplifier 26 allows the 4db peaking in the response of the amplifier 54 when both amplifiers 26 and 54 are operating to provide a total 18db attenuation rate but to reduce the peaking to 0.5db or less when the amplifier 54 is operating alone with switch 90 in the normally open position.

The *y* inputs to multipliers 62 and 70 are connected to the *y* input of the multiplier 34 and receive in common the control signal from the control signal generator 22.

In the normally closed position of switch 93 the output of the low frequency filter 18 is fed into the input of the high frequency filter 20. The high frequency filter 20 comprises a multiplier 94 receiving on an inverting *x* input the signal from switch 93 and outputting through a variable resistor 96 to an operational amplifier 98 which has a negative feedback capacitor 100. The output of amplifier 98 is inputted to an inverting *x* input of a multiplier 102 with the noninverting *x* input grounded. The output of the multiplier 102 feeds through a resistor 118 to an integrating amplifier 120 having a negafeedback capacitor 122.

The output of integrating amplifier 120 is fed back directly to the noninverting x input of the multiplier 94 at the front end of the high frequency filter 20. From the output of multiplier 102 a negative feedback path 104 leads to the input of operational amplifier 98 and comprises a resistor 106 feeding an inverting amplifier 108 with a feedback resistor 110 which defines the gain of amplifier 108 in conjunction with resistor 106. From the output of amplifier 108 a variable resistor 112 leads through a D.C. blocking capacitor 114 to the input of operational amplifier 98. A resistor 116 shunts the series combination of capacitor 114 and variable resistor 112. The feedback path 104 in conjunction with the variable resistor 112 provides a corner peaking control for the low-pass, high frequency filter 20 as well as a maximum low frequency gain limit to the integrating amplifier 98. The feedback from the output of the amplifier 120 to the noninverting input of multiplier 98 provides further flattening of the low frequency gain of amplifiers 98 and 120 in series. At high frequencies, however, the integrating capacitors 100 and 122 around amplifier 98 provide most of the feedback and control the response of amplifiers 98 and 120 and multipliers 94 and 108 to have a total low distortion, linear 12db per octave decrease in gain with increasing frequency and a low distortion transition or corner between the flat and attenuated responses. The y inputs to multipliers 94 and 102 again provide overall gain control and effect a variation in the cutoff frequency over a wide range of at least 30 to 1 without altering peaking or attenuation characteristics and thus keeping distortion low.

A multiplier 124 receives at an inverting input the output of the 12db per octave filter from amplifier 120 and outputs through a resistor 126 into an integrating amplifier 128 having a negative feedback capacitor 130. The output of integrating amplifier 128 is also fed directly to the noninverting *x* input of multiplier 124. Shunting the resistor 126 is a series combination of a variable resistor 132, D.C. Blocking capacitor 134, and resistor 136. At the output of multiplier 124 a feedback path leads through a resistor 137 to the input of amplifier 120. The variation of resistors 96, 118 and 132 effect a shift in the range of controlled cutoff frequencies of the high frequency filter 20.

The y inputs of all multipliers 94, 102 and 124 are connected in common to the high frequency control signal from control signal generator 24. The magnitude of the control signal to the multipliers 94, 102 and 124, as in the filter 18, varies the overall gain of the high frequency filter 20 and consequently adjusts its cutoff frequency without effect upon peaking or attenuation characteristics.

The high frequency filter 20, as in the filter 18, can be seen as composed of two separate filters, one with a 12db per octave attenuation rate is composed of multiplier 94, amplifier 98, multiplier 102 and amplifier 120. The 6db per octave attenuation characteristic is imparted by the combination of multiplier 124 and amplifier 128 with a feedback path from the output of amplifier 128 directly to the noninverting *x* input of the multiplier 124. By adjusting the cutoff frequency of the 6db per octave filter through the variable resistor 132 and the degree of corner peaking in the 12db per octave filter with the variable resistor 112 the corner peaking can be added in the 12db portion and neutralized by the 6db portion as with the low frequency filter 18 and a distortion-free filter characteristic obtained with a sharp corner.

A switch 135 connects the switch 93 in a normally closed position to the inverting input of the multiplier 94. Switches 138 and 139 are provided between the 12db and 6db filter sections respectively, and a switch 140 is provided between the 6db section and a system output 141 of the dynamic noise filter so as to connect in a normally closed position the output of the amplifier 120 to the inverting *x* input of the multiplier 124 and the output of the amplifier 128 to the system output 141. In normally open positions the switches 135 and 138 connect the output of the low frequency filter 18 directly to the switch 139 which in turn when closed conducts to the multiplier 124. These switches 139 and 140 in normally open positions connect the switch 138 directly to the system output 141. The feedback path 137 allows the 12db portion to be operated with 4db of corner peaking when the switches 135, 138, 139 and 140 are closed, but with 0.5db or less of corner peaking when switches 139 and 140 disconnect and bypass the 6db portion.

The serial combination of the low frequency filter 18 and high frequency filter 20 as described above provides a total of 18db per octave attenuation in both the high and low frequencies of the audio spectrum with a 30 to 1 control over the cutoff point for each filter. While the 18db per octave could be achieved using three identical 6db per octave filter sections in series for each of the filters 18 and 20, it can be appreciated that one less operational amplifier directly in the signal processing path is used by having a combination of a 6db and a 12db per octave low frequency filter as shown. This of course means that less noise and distortion is added by the filter than had three operational amplifiers for each filter section being used, though clearly the use of three identical 6db per octave filters is a workable alternative. Also by using two integrators to achieve a 12db per octave rate in both the low and high frequency filters 18 and 20, a second order system is produced for each 12db per octave filter section. Such a second order system of course has a tendency to peak or resonate slightly at a specific frequency which accounts for the corner peaking of the 12db per octave filter in both the high and low frequency filters 18 and 20. This corner peaking is easily balanced by providing an equivalent amount of attenuation from the 6db per octave filter section at the point of peaking in the 12db per octave filter section for each of the low and high frequency filters 18 and 20. The net response has actually a sharper corner. When using the 12db per octave filter sections alone without the 6db sections the corner peaking effect is reduced to 0.5db. Of course the 6db per octave filter sections are first order systems and do not therefore have a tendency to peak.

By using functional blocks, that is multipliers, integrators and operational amplifiers to achieve the attenuation-with-frequency transfer characteristics of a filter, not only are the peculiar attenuation curves and distortion characteristics of RLC filters avoided but the filter's cutoff frequency is varied over a far larger range by simply controlling the gain of each multiplier. Furthermore, the wide range of cutoff frequencies is achieved without altering the filter's characteristics such as corner peaking, attenuation rate, and linearity. It is also possible to provide simple adjustments to the corner peaking and cutoff range with variable resistors as indicated above without changing the overall filter characteristics.

The high DC feedback gain of each filter provides DC stability to each integrator. The integrators inherently have low, high frequency noise. The multipliers in each filter are preferably two quadrant transconductance type multipliers described above providing low distortion at both high and low signal levels and having differential multiplier inputs. Four quadrant multipliers or other types of multipliers may be substituted.

The control inputs to the multipliers in both the low and high frequency filters 18 and 20 are provided by the control signal generators 22 and 24. The control signal generator 22 receives as input the signal from the output of the notch filters 16 and by passing them through a low-pass filter 142 eliminates therefrom all signals except the low frequency end of the audio spectrum within the range of frequencies attenuated by the low frequency filter 18. The output of low-pass filter 142 feeds through a potentiometer 144 to an operational amplifier 146 having a feedback path 148 which operates to limit the output of the amplifier 146 to prevent it from exceeding a specified magnitude. The output of the amplifier 146 is fed to a peak rectifier 150 which first full wave rectifies its input then provides an output that rapidly responds to follow a substantial increase in signal but more slowly decays from the peak reached so as to have an output representative of a recent peak input. A square rooter 152 receives the nearly D.C. output of the peak rectifier 150 and in turn outputs a signal representative of the square root of the peak rectified signal so as to compress the high magnitude signals and prevent them from varying the control signal as rapidly as the low frequency signal content varies. The output of square rooter 152 is fed to a non-linear filter 154 which operates similarly to the peak rectifier 150 except that instead of decaying slowly to a ground level the non-linear filter 154 decays toward the level of the signal input to it to achieve a low-pass characteristic for small input changes. The output of the non-linear filter 154 is impressed upon a signal range limiter 155 to establish maximum and minimum limits to the control signal and then a denominator input of a divider 156, with a constant reference 158 input to the numerator input of the divider 156. The output of the divider 156 thus varies in inverse proportionality to its input, and specifically inversely with the signal content in the low frequency portion of the audio spectrum. With lower low frequency signal content a higher control signal is applied to the multipliers of the low frequency filter 18 to increase the gain in the frequency dependent feedback paths and to raise the cutoff frequency of both the 6db and 12db filter sections.

The signal range limiter 155 establishes maximum and minimum limits to the control signal out of the generator 22. For example, the limiter 155 might consist of feedback output limited amplifiers or AND function limited inputs to operational amplifiers. These maximum and minimum outputs of the generator 22 effectively establish high and low frequency limits to the cutoff for the low frequency filter 18.

The divider 156 can be eliminated by providing in place of the multipliers 34, 70, and 62 in low frequency filter 18 dividers having differential inputs. Dividers, however, are more noisy than multipliers making it preferable to use multipliers in the signal chain and a divider 156 to provide the necessary inversion outside the audio signal path.

The control signal generator 24 for the high frequency filter 20 operates basically in the same manner as the control signal developer 22 except that a high-pass filter 160 selects only the high frequency content of the audio spectrum to use in developing the control signal for the high frequency filter 20. A potentiometer 162 connects the output of the high pass filter 160 to an operational amplifier 164 with an output limiting feedback path 166. A peak rectifier 168, a square rooter 170, a non-linear filter 172, and a signal range limiter 173 operate on the output of the operational amplifier 164 in identical fashion to the function of their counter parts in the control signal generator 22. The output of the signal range limiter 173, however, feeds directly into the *y*, multiplicand, inputs of the multipliers in the high frequency filter 20 without the necessity of inversion.

The variable output of the control signal generators 22 and 24 controls the cutoff frequency of the low and high frequency filters 18 and 20 over a 30 to 1 range between 300Hz and 10Hz for the low frequency filter 18 and between 1kHz and 30kHz for the high frequency filter 20. Increasing the bandwidth increases the total amount of noise and particularly the amount of noise within the low and high frequency portions of the audio spectrum. The continuously variable cutoff of the low and high frequency filters 18 and 20 insures that only as much noise is added as can be adequately masked by the signal present in the particular frequency range affected. Because the signal level necessary to mask noise does not vary linearly with increasing bandwidth the square rooters 152 and 170 in each control signal generator are provided to compress the peak magnitudes so as to increase the noise added through the filters 18 and 20 more slowly than the signal level in each frequency range increases.

Figure 2:
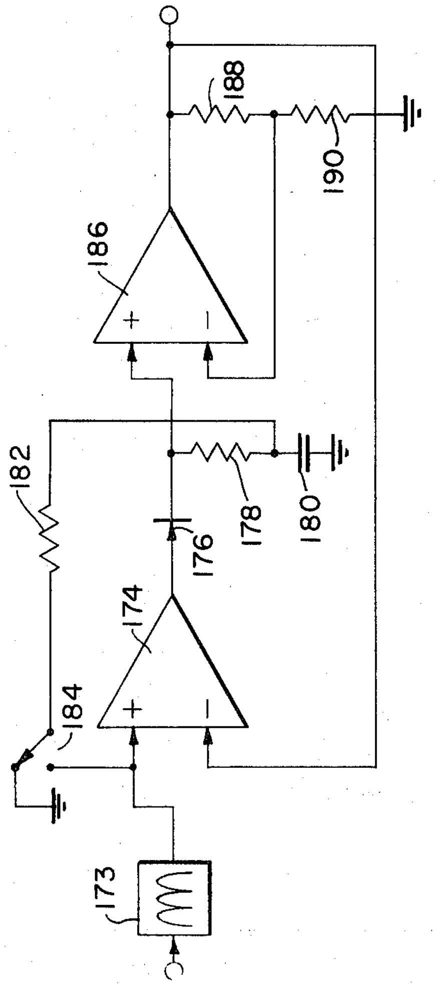
FIG. 2 is a block diagram and partial schematic of the peak rectifiers and non-linear filters of FIG. 1.

Turning now to FIG. 2 there is shown in block diagram and partial schematic representation a specific circuit for accomplishing the functions of peak rectifiers 150 and 168 or non-linear filters 154 and 172. An amplifier 174 receives at its non-inverting input a signal to be peak rectified after passage through a full wave rectifier 173. The output of the amplifier 174 passes through a diode 176, resistor 178 and capacitor 180 to a ground or common terminal. A path from the junction of resistor 178 and capacitor 180 leads through a resistor 182 to a switch 184 which in a normally closed position leads to ground. The junction between the diode 176 and resistor 178 has a connection to an amplifier 186 at its noninverting input. The output of amplifier 186 provides the output of the peak rectifier and also provides feedback through a voltage divider composed of resistors 188 and 190 to the inverting input of the amplifier 186. A further feedback path from the amplifier 186 leads directly to the inverting input of the amplifier 174.

In the normally closed position of switch 184 the FIG. 2 circuitry is operable as a peak rectifier. The diode 176 is part of a high gain, closed loop which insures that its forward conduction voltage is easily overcome by small positive unbalances between the noninverting and inverting inputs of the amplifier 174. Whenever diode 176 conducts during positive cycles at the noninverting input, the capacitor 180 charges rapidly through the low resistance of resistor 178, but discharges more slowly to ground through the resistance of resistor 182. The amplifier 186 follows the instantaneous output of the amplifier 174 without the affect of voltage drop across resistor 178 and therefore the output of the peak rectifier tracks increases in input signals very rapidly as the charge on the capacitor 180 quickly builds up but has a slow decay through the resistor 182.

The amplifier 174 provides conduction through diode 176 only when the signal level at its noninverting output exceeds the level at its inverting inputs. The inverting input level is the same as the output of the amplifier 186 which in turn is related to the voltage level across the capacitor 180 by the ratio of resistor 188 to resistor 190, preferably about 1.5. Thus the signal level at the noninverting input of amplifier 174 must exceed the signal level at the noninverting input of amplifier 186 by 50 percent before conduction through diode 176 occurs to recharge capacitor 180 to a maximum of two-thirds of the peak noninverting input level.

To operate as a non-linear filter the switch 184 is positioned in the normally open configuration to conduct from resistor 182 to the noninverting input of amplifier 174. With this connection the FIG. 2 circuitry is operable in a manner similar to the peak rectifier connection except that the capacitor 180 discharges not to ground but to the average value of the input signal causing a smoothing R-C low-pass effect for small variations in the input but allowing the output of the FIG. 2 circuitry to follow rapidly any large increases (e.g. over 50 percent) in the signal level input to the FIG. 2 circuitry.

The amplifier 186 provides output buffering and isolation as well as increasing the loop gain and establishing the threshold for the quick change condition of the peak rectifier or non-linear filter of FIG. 2.

Figure 3:
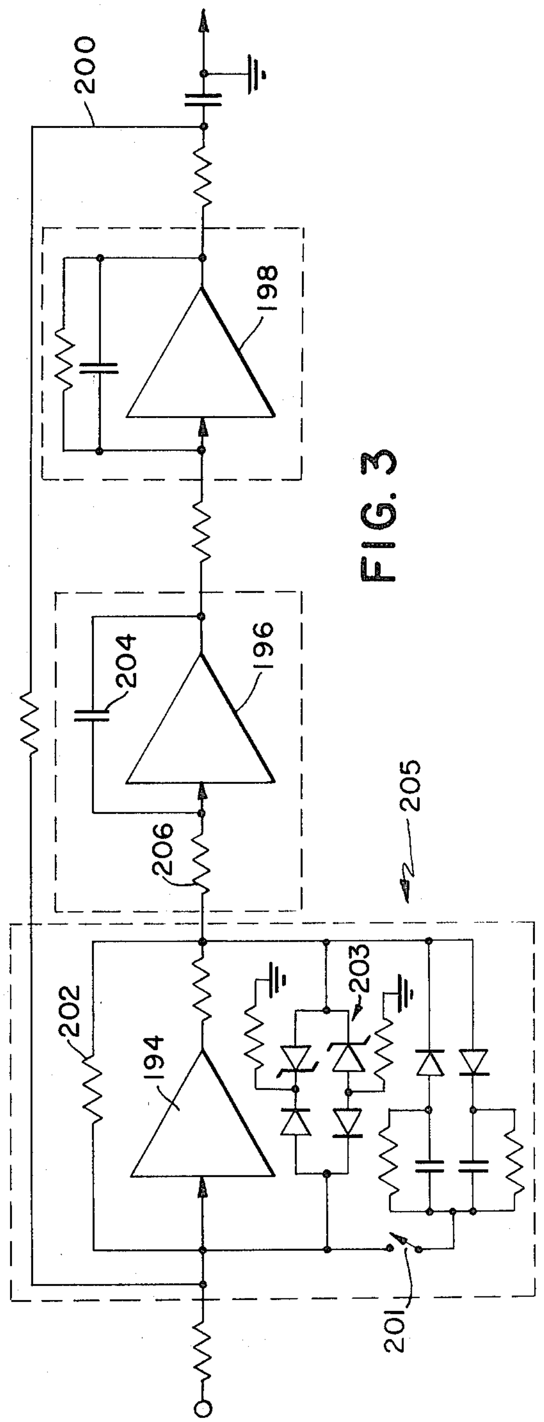
FIG. 3 is a block diagram and partial schematic representation of a click noise impulse limiter useful in the invention.

Referring to FIG. 3 there is shown a block diagram and partial schematic representation of one alternative preferred embodiment for the click limiter 14 of FIG. 1. The click limiter of FIG. 3 operates to limit the slope of the signal input to it such that the output does not exceed that slope. In the case of a very large fast impulse the slope limiting function of this click limiter converts the impulse into a low magnitude triangular wave having leading and following edges equal to the slope limits for the click limiter.

To accomplish this function the circuitry of FIG. 3 comprises a saturating amplifier 194 receiving the input to the click limiter, an integrator 196 following the saturating amplifier 194 and an operational amplifier 198 providing output for the circuitry from the integrator 196. A path of negative feedback 200 is taken from the output of the amplifier 198 to the input of the saturating amplifier 194.

Saturating amplifier 194 has in addition to a normal resistive feedback path 202 a second feedback path 203 composed of a back-to-back combination of a Zener and temperature compensating diode in parallel with a face to face combination of a Zener and temperature compensating diode. This second feedback path is inoperative until the output of the saturating amplifier 194 exceeds the Zener breakdown voltage of one of the diodes at which point the output of the saturating amplifier 194 is limited to a constant value for that and all higher inputs.

The integrating amplifier 196 has an integrating feedback capacitor 204 and an input, time constant determining resistor 206 normally providing an integration rate such that the feedback path 200 overrides the effect of capacitor 204 to impart to the integrator 196 the characteristics of a flat frequency response amplifier well beyond limits of the audio spectrum. When the saturating amplifier 194 becomes saturated, however, the normal loop operation provided through feedback path 200 is interrupted and the integrating amplifier 196 begins to integrate the constant positive or negative output of saturating amplifier 194. The further amplifier 198 provides phase inversion to make the feedback through the path 200 negative, output buffering for the click limiter, and also increases the overall loop gain.

When a narrow (100 microseconds), high frequency, high magnitude impulse reaches the input to the saturating amplifier 194 the amplifier 194 is driven into saturation by the leading edge of the impulse. The constant output of the amplifier 194 during saturation causes the integrating amplifier 196 to produce a smooth ramp which though increasing the negative feedback to the saturating amplifier 194 through feedback path 200 is insufficient to take the amplifier out of saturation until the falling edge of the impulse which in combination with the negative feedback of integrator 196 causes the amplifier 194 to go into saturation of the opposite polarity with resulting integration in the opposite direction to complete a low magnitude, slope limited, triangle wave reproduction of the original high frequency, high magnitude impulse.

A switch 201 may be closed to connect a circuit 205 in parallel with the circuit 203 in feedback relationship around the saturating amplifier 194. Two oppositely conducting parallel combinations of series capacitors and diodes in circuit 205 cause output limiting of the amplifier 194 whenever a high frequency, high magnitude impulse causes the amplifier 194 to respond rapidly. In this configuration the amplifier 194 saturates and is limited to the output present at the instant that the impulse is received and the slope limited triangle wave begins at and returns to that value with positive and negative slopes dependent upon the output level at saturation.

Figure 4:
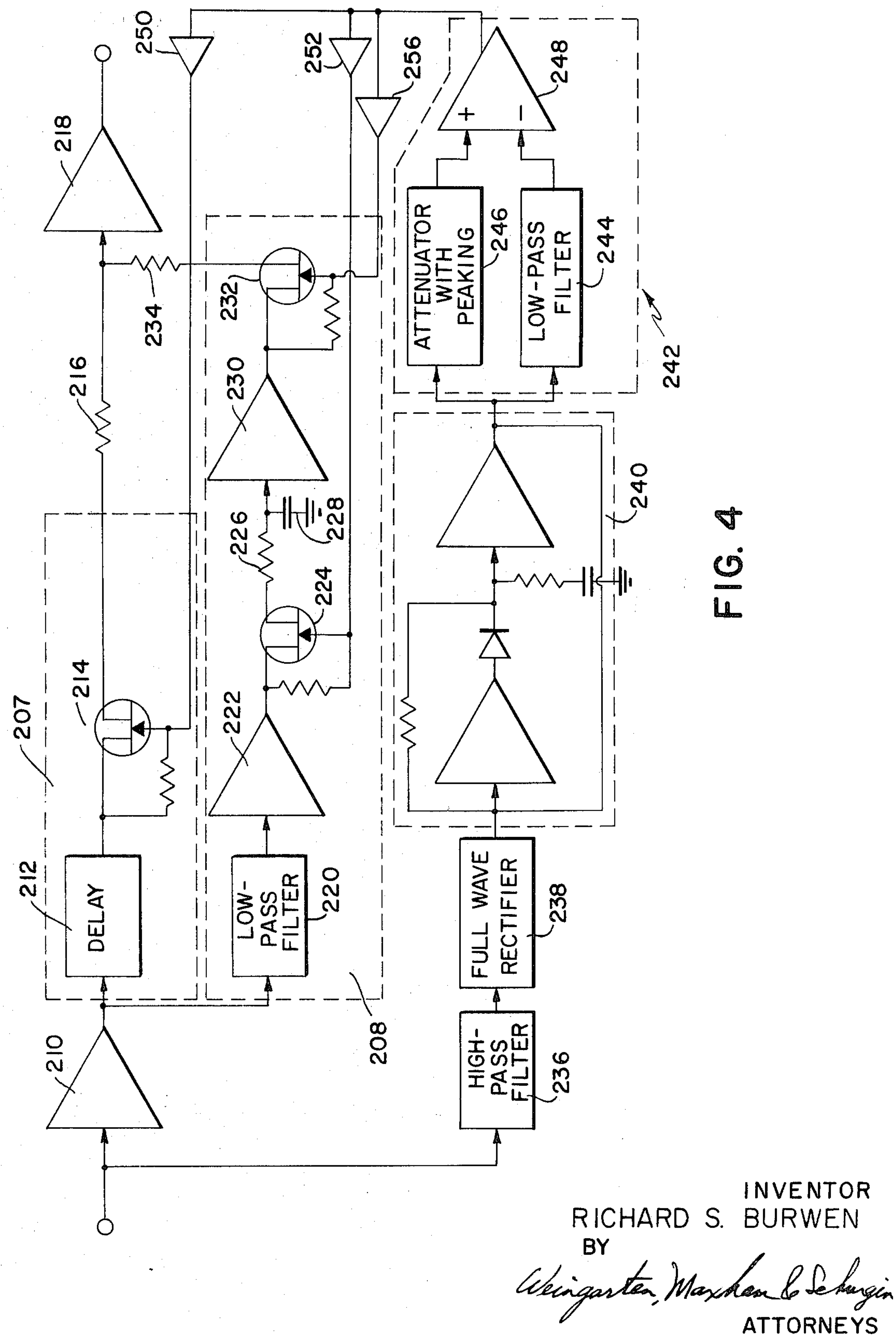
FIG. 4 is a block diagram and partial schematic of an alternative implementation of a click noise limiter.

Referring to FIG. 4 there is shown a signal blanking circuit alternative for accomplishing the click limiting function 14 of FIG. 1. Shown in partial schematic and block diagram representation are two signal channels 207 and 208 fed by an amplifier 210 which in turn receives the input 12 of the dynamic noise filter of FIG. 1. The channel 207 contains a delay circuit 212 which functions to delay the signal between its input and output by approximately 180 microseconds. The output of the delay 212 is fed to an FET 214 which normally conducts the output of the delay circuit 212 through a resistor 216 to an output amplifier 218. The output of amplifier 210 is inputted to the second signal channel 208 through a low-pass filter 220 with approximately a 3kHz cutoff then buffer amplified in an amplifier 222 before passing through a normally conducting FET 224 to a sample and hold capacitor 228 via a resistor 226. A buffer amplifier 230 lowers the current drain on capacitor 228 in applying its voltage to the output amplifier 218 through a normally non-conducting FET 232 and a resistor 234.

The signal impressed upon the input amplifier 210 is fed through a high-pass filter 236 with a 12db per octave attenuation rate and a 30kHz cutoff frequency. The resulting high frequency content is full wave rectified in rectifier 238 and then peak detected in a circuit 240 similar to the circuit of FIG. 2. The output of peak detector 240 is fed to a comparator 242 which divides its input into a low-pass filter 244 and an attenuator 246 with high frequency peaking. The output of the low-pass filter 244 is fed to an inverting input of a differential amplifier 248 having about four times the gain of the noninverting input to which is fed the output of the high frequency peaking attenuator 246. Thus the output of the comparator is zero or below for all inputs except a high frequency click impulse which passes through the peak rectifier 240 and the attenuator 246 as a fast rise, slow decay input to the complementing input of differential amplifier 248. This step input causes the amplifier 248 to saturate for a period of from thirty microseconds to 2 milliseconds depending upon the magnitude of the step impulse to it.

The output of the comparator 242 taken from the amplifier 248 is fed to FET driving gates 250 and 252 which in turn control the FETS 214 and 224 respectively. An inverting gate 254 inverts the output of amplifier 248 and controls FET 232.

In operation a normal input signal passes through the amplifier 210, first channel 207, FET 214, and output amplifier 218 into the series notch filters 16 of FIG. 1. At the same time the signal passes through the low-pass filter 200, amplifier 222, FET 224, and appears across the capacitor 228 for amplification by amplifier 230; but is prevented from passing to the output amplifier 218 by the FET 232 in its normally open condition. When a high frequency, high magnitude impulse appears at the input, however, the comparator 242 is triggered to cause the driving gates 250, 252, and 256 to change their state opening Fet's 214, and 224 and closing FET 232 to pass the voltage across capacitor 228 to the output of amplifier 218 and preventing further signals from passing to the capacitor 228 from the input. The delay of circuit 212 is approximately 180 microseconds while a delay of the low-pass filter 220 is approximately 80 microseconds. These compensate for a delay in the high-pass filter 236, full wave rectifier 238, peak rectifier 240, and comparator 242 so that no portion of the high frequency, high magnitude impulse passes to the output amplifier 218 from FET 214 until the driving transistors 250, 252, and 256 have been switched into the opposite state by the presence of the high frequency, high magnitude impulse. When switching of these transistors does occur, the signal level held by sample and hold capacitor 228 is an approximate average of the low frequency content during the impulse because of the low-pass filter 220 and lower delay than the signal at the driving gates. This average is passed through FET 232 to output amplifier 218 providing a constant output signal for the time that the amplifier 248 remains saturated, a time which increases with higher magnitude high frequency impulses. The saturation delay of amplifier 248 insures that its output will not return to zero and restore the FET driving transistors to their normal state until after the passage of the impulse, no matter how large. When the amplifier 248 does return to zero the normal signal through the channel 206, as delayed 180 microseconds, is restored with minimum interruption caused by the high frequency, high magnitude impulse.

To keep the FET's switched during any size impulse, the attenuator 246 is preferably a fast rise, slow decay circuit wherein the decay rate slows with output level decay more than a single C-R time constant. For example several C-R circuits could be provided so that the decay is stretched in time in a non-linear manner. In this way the output excursion of the attenuator increases with increasing click magnitudes and the time during which it is above the output of the low-pass filter 244 increases rapidly enough to insure that the FET's are switched for the total length of high magnitude impulses.

Best results are achieved for this click limiter by providing high frequency pre-emphasis at the input and high frequency de-emphasis at the output. These functions can normally be achieved by emphasis networks in the amplifier 210 and 218 respectively.

System high frequency pre-emphasis and de-emphasis may be provided by respective emphasis networks 260 and 262 before and after the terminals 12 and 141.

Having described a preferred embodiment and alternatives for practice of this invention, it will be appreciated by those skilled in the art that other implementations and modifications can be employed. It is accordingly intended to define this invention only as indicated in the following claims.

What is claimed is:

1. A dynamic noise filter for reducing perceived noise in an audio signal having a wide range of audio frequencies, said dynamic noise filter comprising:

at least one means for generating a control signal in response to said audio signal, said control signal being representative of the amplitude of said audio signal over a limited frequency range thereof including an end portion of said wide range of audio frequencies;

said generating means being adapted to produce said control signal with a controlled fast attack characteristic in responding to increases in peak magnitudes of said audio signal within said limited frequency range and with a slow decay characteristic in responding to decreases in peak magnitudes of said audio signal within said limited frequency range; and means for variable cutoff point filtering of said audio signal to provide reduction in perceived noise in said audio signal and having said cutoff point variable over a substantial portion of said wide range of audio frequencies in response to said control signal, the range of variation of said cutoff point including said end portion of said wide range of audio frequencies;

said variable cutoff point filtering means being adapted to provide a selectable constant attenuation rate and a minimum attenuation limit to define a low distortion corner characteristic without significant variation thereof over the range of variation of said cutoff point;

said generating means being adapted to increase the frequency range passed by said variable cutoff point filtering means as the amplitude of said audio signal within said limited frequency range increases;

the relationship between said limited frequency range amplitude and the degree of increase in the frequency range passed by said variable cutoff point filtering means being prescribed by a preselected noise masking requirement.

2. A dynamic noise filter for reducing the effect of noise within a predetermined frequency range of a signal comprising:

means for receiving said signal over at least its predetermined frequency range;

at least one means for filtering said received signal and including means for providing a uni-directional variation in gain with frequency;

said filter means having gain limiting means to limit the gain of said uni-directional varying characteristic over a portion of said predetermined frequency range to provide a low distortion corner characteristic between said portions of unidirectionally varying gain and limited gain;

said filter means further having means for varying the cutoff point associated with said corner characteristic in response to a control signal without significant variation in the shape of said corner and variable gain characteristics; and means for generating said control signal in response to said received signal and representative of the frequency content of said received signal within the portion of the predetermined frequency range over which said cutoff point is variable.

3. The dynamic noise filter of claim 2 wherein said means for providing uni-directional variation in gain comprises active amplification elements and said control signal is operative to vary the amplification thereof to produce a wide range variation in said cutoff point of said filtering means.

4. The dynamic noise filter of claim 2 wherein said means for generating said control signal further includes:

means for filtering said received signal to substantially eliminate all signal frequencies outside the range of variation of said cutoff point; and means for peak rectifying the filtered signal and adapted to develop said control signal with a controlled fast attack and slow decay characteristic in responding to increases in the magnitude peaks of the filtered signal.

5. The dynamic noise filter of claim 2 further including means for high frequency pre-emphasis and de-emphasis placed respectively before and after said filtering means thereby to augment the response of said filtering means to the higher frequency portions of said predetermined frequency range.

6. The dynamic noise filter of claim 2 further including narrow-band pre-filtering means for hum noise elimination thereby to prevent response by said control signal generating means to said hum noise.

7. The dynamic noise filter of claim 2 wherein said means for generating said control signal comprises:

means for filtering said received signal to substantially eliminate all signal frequencies outside the range of variation of said cutoff point;

means for magnitude limiting the filtered signal;

means for peak rectifying the limited signal; and means for non-linearly filtering the peak rectified signal and adapted to low-pass filter small amplitude variations and decreases in said peak rectified signal and to pass with significantly less filtering all increases in said peak rectified signal which exceed a predetermined percentage of said peak rectified signal prior to said increase.

8. The dynamic noise filter of claim 7 wherein said means for generating said control signal further includes means for magnitude compressing said peak rectified signal before said non-linear filtering.

9. The dynamic noise filter of claim 7 wherein said means for generating said control signal further includes means for inverting said non-linearly filtered signal.

10. The dynamic noise filter of claim 2 further including pre-filtering means for limiting short duration click noise impulses in said received signal thereby to prevent activation of said control signal generating means in response to said short duration click noise impulses and to attenuate signals representative of said click noise impulses before application to said filtering means.

11. The dynamic noise filter of claim 10 wherein said prefiltering means includes:

means for detecting a click noise impulse;

switchable means having first and second selectable states for providing in said first state an output signal which is a substantial reproduction of an input signal applied to said pre-filtering means, and for providing in said second state an output signal approximately equal to the average low frequency signal content of said pre-filter input signal during said click noise impulse; and means operative in response to each detected click noise impulse for switching said switchable means to said second state during the occurrence of each detected click noise impulse and to said first state in the absence of detection of click noise impulses.

12. The dynamic noise filter of claim 10 wherein said prefiltering means further includes a signal blanking circuit comprising:

first and second parallel channels;

means for time delaying the signal through said first channel;

means for low-pass filtering the signal in said second channel;

means for sampling and holding the filtered signal level in said second channel;

means for summing the outputs of said first channel and said sample and hold means;

means for interrupting the signal from said first channel to said summing means;

means for interrupting the signal from said sample and hold means to said summing means;

said means for interrupting said first channel signal being normally in a non-interrupting condition and said means for interrupting said sample and hold signal being normally in an interrupting condition;

means for detecting a click noise impulse at the input of said first and second channels; and means for generating a blanking signal having a duration representative of and at least as great as the duration of each click noise impulse;

said interrupting means for said first channel signal and said interrupting means for said sample and hold signal being responsive to said blanking signal to reverse their condition upon the generation of said blanking signal;

said sample and hold means being responsive to said blanking signal to sample and hold for the duration of said blanking signal the approximate average of the low-pass filtered signal level present in said second channel during an impulse.

13. The dynamic noise filter of claim 10 wherein said prefiltering means includes:

first and second series connected wideband amplifiers with the output signal of said second amplifier negatively fed back to the input of said first amplifier; and an integrator in a signal conducting path between said amplifiers;

said first amplifier being operative to provide an amplitude limited output in the presence of click impulses, said second amplifier providing in the absence of said amplitude limited output an output signal which is a frequency insensitive amplification of the input of said first amplifier, and providing in the presence of said amplitude limited output a triangular wave signal of substantially lower magnitude than said click impulses.

14. The dynamic noise filter of claim 13 wherein said first amplifier provides an output limited during click noise impulses to a magnitude approximately equal to the output magnitude at the start of a click noise impulse.

15. The dynamic noise filter of claim 2 wherein said means for filtering said received signal further includes at least one signal amplifier having:

a gain limit determining resistive feedback path; and at least one controllable rate integrator having its integration rate varied in response to said control signal.

16. The dynamic noise filter of claim 15 wherein said at least one controllable rate integrator further comprises:

an integrating operational amplifier; and a variable gain element having first and second inputs receiving respectively the output of said signal amplifier and said control signal whereby the amplification of said first input is dependent upon the signal level of said second input;

said integrating operational amplifier and said variable gain element being serially connected to form said controllable rate integrator.

17. The dynamic noise filter of claim 2 wherein said means for filtering said received signal further comprises:

a series combination of at least one controllable rate integrator; and a signal path of gain limit determining feedback around at least one of said integrators;

each controllable rate integrator having its rate of integration varied in response to said control signal.

18. The dynamic noise filter of claim 17 wherein each said controllable rate integrator further comprises:

an integrating operational amplifier; and a variable gain element having a first and second input receiving respectively the signal to be filtered and said control signal whereby the amplification of said first input is dependent upon the signal level of said second input;

one integrating operational amplifier and one variable gain element being serially connected to form each said controllable rate integrator.

19. The dynamic noise filter of claim 2 wherein said means for filtering said received signal further comprises:

a first filter section having a first attenuation rate in its filter roll-off characteristic; and a second filter section in series with said first filter section and having a second attenuation rate substantially higher than said first rate;

said second section having a significant degree of corner peaking;

said first section having at the frequency of said corner peaking an attenuation of substantially the same degree as the degree of said corner peaking.

20. The dynamic noise filter of claim 19 further comprising:

means for selectively by-passing said first and second sections; and means for substantially reducing the corner peaking of said second section when said first section is by-passed.

21. A dynamic noise filter for minimizing perceived audio noise in a received signal comprising:

means for low frequency, high-pass filtering said received signal over the lower frequency portion of an audio frequency range and including first varying gain means for providing a gain increasing with frequency and means for limiting the gain of said first varying gain means at a predetermined level to define a low distortion corner having a cutoff point, said first varying gain means being adapted to adjust its gain in response to a low frequency control signal whereby said cutoff point is variable over a substantial portion of said audio frequency range without producing significant variation in said corner and varying gain characteristics;

means for high frequency, low-pass filtering said received signal over the higher frequency portion of said audio frequency range and including second varying gain means for providing a gain decreasing with frequency and means for limiting the gain of said second varying gain means to a predetermined value to define a low distortion corner having a cutoff point, said second varying gain means being adapted to adjust its gain in response to a high frequency control signal thereby to vary the cutoff point of said corner characteristic without significant variation in said corner and varying gain characteristics;

means for generating said low frequency control signal in response to said received signal and representative of the amplitude of said received signal in the range of variation of said low frequency cutoff point; and means for generating said high frequency control signal in response to said received signal representative of the amplitude of said received signal over the range of frequencies within the range of variation of said high frequency cutoff point;

said low and high frequency control signals being operable to vary the passband for said received signal from a minimum bandwidth including primarily middle audio frequency ranges to a maximum bandwidth containing substantially all audio frequencies.

22. The dynamic noise filter of claim 21 wherein said low and high frequency control signal generating means are adapted to increase the passband for said received signal by an amount which increases the audio noise at frequencies which may be substantially masked by signal content from which said control signals are generated.

23. The dynamic noise filter of claim 21 wherein said means for low frequency filtering further comprises:

at least one amplifier;

at least one variable rate integrator forming a feedback path around each said amplifier and having an integration rate controlled in response to said low frequency control signal; and a gain limit determining path of negative feedback around each said amplifier; and said means for high frequency filtering further comprises:

at least one controllable rate integrator having its integration rate controlled in response to said high frequency control signal; and at least one path of negative gain limit determining feedback around at least one of said controllable rate integrators.

24. The dynamic noise filter of claim 22 wherein each said controllable rate integrator further comprises:

an integrating operational amplifier; and a low distortion, two quadrant multiplier in series with said integrating operational amplifier, said multiplier having its multiplicand input receiving the control signal corresponding to the filter of which the integrator is a part and having its multiplier input in the signal path.

* * * * *